(12) United States Patent
Didur

(10) Patent No.: US 6,648,027 B1
(45) Date of Patent: Nov. 18, 2003

(54) TIRE INFLATION TRANSFER TUBE

(76) Inventor: Victor Didur, 6109 Plumas Ave., Richmond, CA (US) 94804

( * ) Notice: Subject to any disclaimer, the term of this patent is extended or adjusted under 35 U.S.C. 154(b) by 0 days.

(21) Appl. No.: 10/360,131

(22) Filed: Feb. 5, 2003

(51) Int. Cl.[7] .................................................. B65B 1/04
(52) U.S. Cl. ......................................... 141/38; 152/415
(58) Field of Search .............................. 141/38; 152/415

(56) References Cited

U.S. PATENT DOCUMENTS

| | | | |
|---|---|---|---|
| 2,237,559 A | * 4/1941 | Jenne | 137/223 |
| 5,070,917 A | * 12/1991 | Ferris et al. | 141/38 |
| 5,419,377 A | * 5/1995 | Harris | 141/38 |
| 6,431,225 B1 | * 8/2002 | Dudley | 141/38 |

* cited by examiner

*Primary Examiner*—Steven O. Douglas
(74) *Attorney, Agent, or Firm*—Gary Baker, Esq.

(57) ABSTRACT

The invention provides tire inflation transfer tubes and methods of use. The transfer tubes can be flexible tubing with standard valve stem connectors to provide sealed transfer of pressurized gas between an inflated tire and a tire to be inflated.

16 Claims, 1 Drawing Sheet

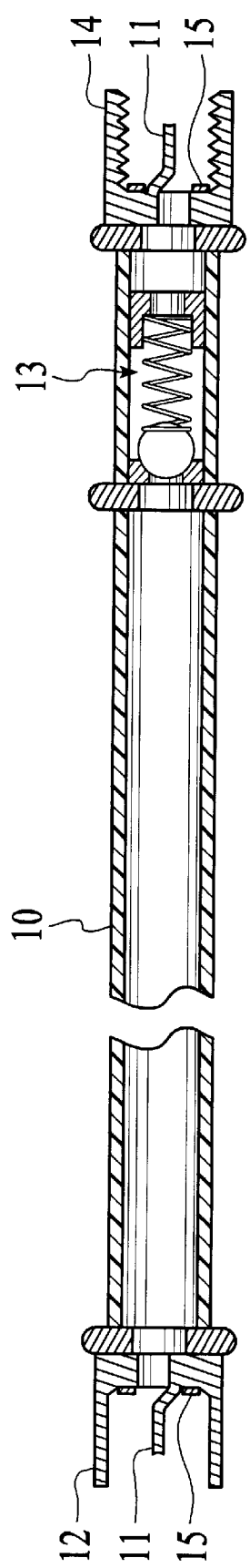

TIRE INFLATION TRANSFER TUBE

BACKGROUND OF THE INVENTION

1. Field of the Invention

The invention relates to devices and methods, e.g., to transfer compressed air from a compressed air container to a tire in need of inflation. The devices of the invention can be highly portable and light weight, providing particular utility for bicycle riders.

2. Description of Related Art

Many load carrying devices, such as vehicles, carts, and wheel borrows, employ pneumatic tires to provide smooth rolling over a variety of surfaces. A major difficulty with pneumatic tires has been providing pressurized air for inflation of the tires. Many solutions to the inflation problem have been devised, such as provision of pump stations, portable hand pumps, and portable pressurized gas canisters.

Before pneumatic tires became common, wheels on vehicles were generally made from hard materials, such as wood or iron. Many of the hard materials were strong and long wearing but transmitted jarring shocks from irregular surfaces and provided poor traction. Solid rubber tires were a big improvement in traction and ride comfort. Traction and ride smoothness were further improved when materials technologies allowed manufacture of air filled tires tough enough for reliable use without frequent punctures.

When pneumatic tires became common on automobiles, service stations began to provide customers pressurized air through a hose from a pressurized canister filled by a motorized pump. As a motorist's tires slowly lost pressure, they could be periodically topped off with pressure while stopped at a service station for fuel. If a tire suddenly went flat out on the road, a motorist could replace the flat tire with an inflated spare tire carried in the vehicle.

Bicyclists also generally prefer pneumatic tires for their smooth ride and good traction. However, as it is difficult to carry heavy and bulky items on a bicycle, spare tires are not commonly brought along on bicycle trips. Bicyclists can carry a spare inner tube, or tire patch kit, to repair punctured tires on the road. Hand pumps, generally comprising one-way valves directing air through a hand-powered piston/cylinder system, can also be carried on a bicycle to inflate a repaired tire or to refresh a slowly leaking tire. However, many bicyclists pay a premium for light weight, stream lined, bicycles and find it problematic to carry a heavy and bulky pump with them while cycling. What's more, hand pumps mounted to bicycle frames are tempting items for thieves.

One solution to the problem of obtaining pressurized air for tire inflation on the road is to carry a canister of pressurized gas along with the bicycle or motor vehicle. In U.S. Pat. No. 5,012,954, Tire Inflation System, to Will, for example, a pressurized gas canister can be used to inflate a bicycle tire. However, such systems are single use, and can be expensive, bulky and heavy. In addition because they are not normally mounted to the bicycle, the user must remember to bring them along for the ride.

A need remains for simple and effective devices and methods to inflate a tire out on the road. It is desirable to have an inexpensive, light weight, easily stored device for inflation of tires and other gas filled objects. The present invention provides these and other benefits, as will be made evident in the disclosure that follows.

SUMMARY OF THE INVENTION

The tire inflation transfer tubes of the invention provide ways, e.g., to transfer compressed air from an inflated tire to a tire in need of inflation. The transfer tube can be, e.g., a flexible tube with valve stem connectors at each end to provide transfer of air pressure from a source tire to a receiving tire without leakage. The transfer tube can be used, e.g., by sealing the receiving connector to a receiving tire, pressing the source connector onto the valve stem of the source tire, and waiting a few moments until the receiving tire is adequately filled with air.

For example, the tire inflation transfer tube can be fabricated as a tube with a first end and a second end, a source connector can be formed at the first end of the tube, and a receiving connector can be formed at the second end of the tube so that the receiving connector can be connected to a receiving tire valve stem, and the source connector can be connected to a source tire valve stem, thereby inflating the receiving tire. In a particular embodiment, the tire inflation transfer tube can include: a flexible tube with two ends; a source connector formed at one end having a protruding member (valve opener) and a resilient (first) seal; and, a receiving connector formed at the other end with a protruding member (valve opener) and a resilient (second) seal.

Although the tube can be rigid for some applications, it is preferred the tube be flexible to allow manipulation of the tube to easily seal the connectors onto valve stems presented at almost any angle. The tube can be fabricated from metal, but the preferred materials include flexible substances such as rubber, plastic, silicone, polypropylene, fluorocarbon polymer, polyethylene, and/or the like. The tube can beneficially include a supporting net or braid of nylon or mylar fibers to enhance strength and resistance to blow out. The tube can be any appropriate length, but for most applications, a length ranging from about 6 inches to about 40 inches is suitable to span the distance between source and receiving valve stems.

The connectors can be formed on the ends of the tube by any means known by those skilled in the art, such as, e.g., insertion of a tubular connector extension within the tube and sealing with a clamp, melting or gluing the connectors into the tube, or forming the tube and connectors as an integral unit by injection molding. The connectors can have a threaded internal surface adapted to connect to an external threaded valve stem of a tire. The connectors can have a protruding member adapted to push open valve stems, such as Schrader valves, when the connectors are sealed on a valve stem. The connectors can have seals (first and second) made of a resilient material to prevent air leaks during transfer procedures. The connectors can have a protruding member adapted, e.g., to push open a Schrader valve when the receiving connector is sealed on a receiving tire valve stem. It is preferred that the source connector have a protruding member to force open the valve at the compressed gas source to begin transfer of gas to the receiving tire.

The tube and/or connectors can have a one-way valve mounted, e.g., in the lumen, which allows passage of gas from the source connector to the receiving connector. The one-way valve can seal to prevent air from escaping the receiving tire, e.g., when the source connector has been removed from the compressed gas source valve stem. The one-way valve can be, e.g., a ball and seat valve, a reed valve, a flapper valve, a cone and seat valve, and/or the like.

The transfer tube can be configured to fit into the seat stem of a bicycle with one connector outside of the stem to be gripped for removal and use. For example, the outside diameter of the tube and one of the two connectors can be not more than about 2 cm (or less than a particular seat stem internal diameter), while the outside diameter of the other connector is more than about 2 cm (or larger than a particular seat stem internal diameter); the larger connector not fitting into the seat stem. The transfer tube will fit securely and accessibly into a seat stem if the tube is narrow enough to enter a bicycle seat stem, and the source connector or the receiving connector is too large to enter the seat stem.

The present invention includes methods of inflating a tire. A receiving tire can be inflated from a compressed gas source by sealing a receiving connector of a transfer tube onto the valve stem of the receiving tire, and sealing a source connector having a protruding member onto the valve stem of the compressed gas source, so that compressed gas from the compressed gas source is transferred to the receiving tire. The presence of a one-way valve in the tube, the source connector, or the receiving connector can prevent escape of gas from the receiving tire while the methods of the invention are practiced. When the transfer operation is complete, the transfer tube can be stored substantially inside a bicycle seat stem.

BRIEF DESCRIPTION OF THE DRAWINGS

The invention will now be more particularly described in connection with its preferred embodiments and with reference to the accompanying drawings wherein:

The FIGURE shows a schematic diagram of an exemplary transfer tube.

DEFINITIONS

Before describing the present invention in detail, it is to be understood that this invention is not limited to particular devices or inflation methods, which can, of course, vary. It is also to be understood that the terminology used herein is for the purpose of describing particular embodiments only, and is not intended to be limiting. As used in this specification and the appended claims, the singular forms "a", "an" and "the" include plural referents unless the content clearly dictates otherwise. Thus, for example, reference to "a tire" includes a combination of two or more tires; reference to "gas" includes mixtures of gases, and the like.

Unless defined otherwise, all technical and scientific terms used herein have the same meaning as commonly understood by one of ordinary skill in the art to which the invention pertains. Although any methods and materials similar or equivalent to those described herein can be used in the practice for testing of the present invention, the preferred materials and methods are described herein. In describing and claiming the present invention, the following terminology will be used in accordance with the definitions set out below.

The term compressed gas source, as used herein, refers to a source of pressurized gas accessible through a valve stem. For example, a compressed gas source can be an inflated car tire, truck tire, bicycle tire, and/or any pressurized chamber with an adaptable valve stem. Typically, compressed gas sources of the invention are, e.g., inflated truck tires, car tires, or bicycle tires.

The term receiving tire, as used herein, refers to a chamber with a valve stem with less internal gas pressure than a chosen compressed gas source. For example, a receiving tire can be a deflated tire, partially inflated tire, a basketball, or any sports ball inflatable through an inflation needle, and/or the like. Typically, receiving tires of the invention are, e.g., bicycle tires.

The term valve stem, as used herein, refers to a standardized port for filling and/or deflating a source tire and/or receiving tire. For example, a valve stem can be a valve stem on a bicycle tire, car tire, truck tire, and/or the like, or a filler adaptor, such as a fill "needle" for sports ball inflation, or adaptors between valve stem standards, such as adaptors between Schrader valves and Presta valves. Typically, valve stems of the invention are, e.g., standard Schrader valve stems associated with a tire.

The term compressed air, as used herein, refers to gasses with a pressure greater than ambient atmospheric pressure. For example, compressed air can be air inside an inflated tire, $CO_2$ or nitrogen inside a pressure canister, air coming from a compressor, and/or the like. Typically, compressed air in the invention is, e.g., air from an inflated tire.

DETAILED DESCRIPTION OF THE INVENTION

The present invention provides tire inflation transfer tubes and methods, e.g., to use commonly available compressed air from one tire to inflate another tire. The tire inflator transfer tube, as shown in FIG. 1, can be, e.g., flexible tube 10 with a valve stem connector on each end, a protruding member 11 (valve opener) directed out from the central lumen of at least one connector (usually at least source connector 12), and one-way valve 13 to allow air flow only in the direction of the tire to be inflated, through receiving connector 14. The connectors can have, e.g., resilient seals 15 to prevent escape of gasses during transfer operations. Methods of the invention include, e.g., sealing the receiving connector to the valve stem of a deflated (receiving) tire, and sealing the source connector to a valve stem of an inflated (compressed gas source) tire so that the protruding member pushes open the source stem valve to release compressed air from the inflated tire to flow through the tube to the deflated receiving tire. Next, for example, the source connector can be removed from the source stem when the receiving tire has been inflated; air will not escape from the receiving tire as the one-way valve prevents escape of gas away from the receiving tire. Finally, the receiving connector can be removed from the receiving valve stem and stored, e.g., within the stem of a bicycle seat.

THE TRANSFER TUBE

The transfer tube of the invention can be, e.g., a flexible hollow tube with connectors sealable to tire valve stems at each end. The sealable end connectors can have, e.g., protruding members to release compressed air from a compressed air source, and a threaded inner surface to hold the connectors onto external threads of valve stems. The transfer tube can have a valve allowing air to move through the tube in only one direction, e.g., so that air is not lost from the receiving tire when the source end connector is not sealed to the source valve stem.

The Tube

The tube of the transfer tube can be, e.g., a flexible tube long enough to span between the intended compressed gas source valve stem and the receiving tire valve stem. The tube can be long enough to reach, e.g., between a car tire valve stem and the valve stem of a bicycle tire placed near by, or from about 6 inches to about 40 inches. The tube can be any flexible (or articulated) conduit, e.g., capable of facilitating sealing of connectors to valve stems and transferring of compressed air between the compressed gas source and receiving tires. For example, the tube can be fabricated from rubber, plastic, silicone, polypropylene, fluorocarbon polymer, polyethylene, and/or the like. The tube can be strong enough to withstand pressures of compressed air supplied by source tires, such as, e.g., greater than 30 psi, greater than 60 psi, or greater than 100 psi. The tube can be reinforced, e.g., with nylon or stainless steel mesh, to provide higher pressure specifications and improved ruggedness.

The Connectors

Connectors, capable of sealing to valve stems, can be formed at each end of the tube. The connectors can provide, e.g., seals to prevent compressed air from escaping during transfers, threads so that connectors can be screwed onto complimentary threads of valve stems, protruding members adapted to open valve stem valves, and/or one-way valves to allow flow of compressed air in only one direction.

Connectors can be formed on the ends of the tube. For example, connectors can be integrated into the tube at the time of manufacture, e.g., by injection molding. Optionally, connectors can be formed on the ends of the tube by attaching, mounting, locating, connecting, and/or the like, separately manufactured connectors, onto the tube. Connectors can include a collar that can extend over the ends of valve stems to provide centering of seals over stem mouths, internal threads to screw onto outer threads of stems, and/or an outer knurled surface for a better grip by the user during transfer operations.

Seals can be incorporated into the connectors to prevent compressed air from escaping during air transfer operations. Typically, connector seals are resilient rings adapted to sealably contact the mouth of a valve stem. For example, a connector seal can be an o-ring, flat ring, or gasket that conforms to a valve stem surface to provide a hermetic seal between the connector and the valve stem. Seals of the invention can be made from, e.g., rubber, silicone, plastic, leather, and/or the like.

Threads can be incorporated, e.g., on an inside surface of a connector collar to provide screw-on attachment of connectors to valve stems. The inside threads of connector collars can functionally receive the outside threads of source valve stems and/or receiving valve stems to hold the connectors to the stems. By turning the connector threads onto the stem threads, the connector seals can be pressed onto the mouth of the valve stem to seal even when the user is no longer holding the connector onto the stem. Alternately, the source connector can be provided without threads and with an opening large enough to freely slide by the mouth of a valve stem. The user can simply pushing the connector onto the source valve stem and hold until inflation is complete, the connector can then be removed by setting it free, the source stem valve will close itself, and air will not be lost from the receiving tire when a one-way valve is present in the transfer tube.

One-way valves, such as Schroeder valves, ball and seat valves, reed valves, flapper valves, cone and seat valves, and the like, can be incorporated into the connectors. The valves can direct flow of compressed gas from the compressed air source but not allow air to escape the receiving tire. In this way, the transfer tube can be removed first from the source without losing air pressure from the receiving tire, even while the tube remains threadably connected to the receiving tire valve stem. The one-way valves can be biased closed, e.g., with a spring, or they can seat and seal in response to air pressure from the receiving tire. Optionally, one-way valves can be incorporated into the tube section of the transfer tube.

The connectors can have protruding members to force open valves in valve stems. Protruding members can be incorporated into connectors so that, e.g., they protrude in a direction out from the lumen of the connector to come into contact with valve opening mechanisms, such as pins of Schroeder valves. In this configuration, the protruding member can press open the valve of a valve stem as the connector is pressed, or threaded, onto a valve stem. This action can open a receiving tire valve stem allowing compressed air to flow into the tire. This action can open a compressed air source valve to initiate flow of compressed air from the source to the receiving tire. The protruding members do not normally substantially block the flow of gasses through the connectors.

As some bicycle tires or inner tubes have other types of valves, such as Presta valves, the connectors and connector components can have any configuration suitable to open and/or seal these valves, as required. Adaptor devices are available, or can be readily prepared by those skilled in the art, to provide functional seals between valves and/or stems of various types.

METHODS TO TRANSFER A COMPRESSED GAS

The methods of the invention include, e.g., procedures to connect a compressed air source to a receiving tire with a tire inflator transfer tube so that air from the source can inflate the receiving tire. The methods can include, e.g., placing the receiving tire valve stem close to the valve stem of the compressed gas source, threading a receiving connector to the valve stem on the receiving tire, pressing the source connector onto the source valve stem so that the protruding member opens the source valve to release compressed air into receiving tire through the tube, removing the source connector when inflation is complete, and removing the receiving connector from the receiving tire.

The user can choose a compressed air source compatible with the receiving tire. For example, a commercial truck tire with high pressure and large volume can be a suitable source for a bicycle tire because the pressure is adequate and the source will not be significantly deflated due to the procedure. Even lower pressure tires from smaller vehicles can fill a bicycle tire enough for the bicyclist to travel without significantly deflating the source tire. Many bicycle tires remain fully functional when filled to pressures of 50 psi, 30 psi, 15 psi, or less. If the "receiving tire" is a basket ball, the flexible nature of the tube will allow bouncing the ball against solid ground to monitor inflation. Optionally, the user can periodically test the pressure in the receiving tire with a tire pressure gage, or the transfer tube can incorporate a pressure read out gage. Typically, bicycle tires have a higher pressure rating than a motor vehicle tire, so the bicycle tire can be inflated from a vehicle tire without danger of over inflation. A bicyclist can fill a deflated tire from the remaining inflated tire from the same bicycle. For example if the source bicycle tire has a pressure of 60 psi, it can generally inflate the receiving tire to 30 psi allowing travel on adequately inflated tires.

The transfer tube can be manufactured with dimensions adapted to store the tube in small, inconspicuous spaces, such as, e.g., the inside of a bicycle seat stem. For example, the source stem and tube can be narrow enough to slide down into the open top of a bicycle seat stem. If the receiving connector is made too large to slide into the stem, the transfer tube can hang securely, substantially within the stem with the receiving connector sitting on top of the stem for easy grasping and removal of the transfer tube for use.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference in their entirety for all purposes.

What is claimed is:

1. A tire inflation transfer tube comprising:

a tube comprising a first end and a second end;

a source connector formed at the first end of the tube; and, a receiving connector formed at the second end of the tube;

one connector comprising a diameter larger than an internal diameter of a bike seat stem and one connector comprising a diameter smaller than an internal diameter of a bike seat stem;

whereby the receiving connector can be connected to a receiving tire valve stem, and the source connector can be connected to a compressed gas source valve stem, thereby inflating the receiving tire; and, whereby the tire transfer tube can be stored substantially within the seat stem with one connector too large to enter the seat stem.

2. The transfer tube of claim 1, further comprising a one-way valve which substantially prevents passage of gas from the receiving connector to the source connector.

3. The transfer tube of claim 2, wherein the one-way valve comprises at least one of a ball and seat valve, a reed valve, a flapper valve, or a cone and seat valve.

4. The transfer tube of claim 2, wherein the one-way valve is mounted in at least one of the tube, the source connector, or the receiving connector.

5. A tire inflation transfer tube comprising:

a tube comprising a first end and a second end;

a source connector formed at the first end of the tube, which source connector comprises a protruding member and a first seal; and, a receiving connector formed at the second end of the tube, which receiving connector comprises a second seal;

wherein the tube is narrow enough to enter a bicycle seat stem, and the source connector or the receiving connector is too large to enter the seat stem.

6. The transfer tube of claim 5, wherein the tube is flexible.

7. The transfer tube of claim 5, wherein the tube comprises a length ranging from about 6 inches to about 40 inches.

8. The transfer tube of claim 5, wherein the tube comprises rubber, plastic, silicone, polypropylene, fluorocarbon polymer, or polyethylene.

9. The transfer tube of claim 5, wherein the source connector or receiving connector comprises a threaded internal surface adapted to connect to a threaded valve stem.

10. The transfer tube of claim 5, wherein the protruding member is adapted to open a valve when the source connector is sealed onto a compressed gas source valve stem.

11. The transfer tube of claim 5, wherein the first seal or the second seal comprise a resilient material.

12. The transfer tube of claim 5, wherein the receiving connector comprises a protruding member adapted to push open a Schrader valve when the receiving connector is sealed onto a receiving tire valve stem.

13. The transfer tube of claim 5, wherein the outer diameter of the tube, and either the source connector or the receiving connector is not more than about 2 cm.

14. The transfer tube of claim 13, wherein the outer diameter of either the source connector or the receiving connector is more than about 2 cm.

15. A method of inflating a tire, the method comprising:

sealing a receiving connector to a valve stem of a receiving tire, which receiving connector is formed on a first end of a tube;

sealing a source connector to a valve stem of a compressed gas source, which source connector comprises a protruding member and is formed on a second end of the tube;

whereby a valve in the source valve stem is forced open by the protruding member to allow transfer compressed gas from the compressed gas source to the receiving tire; and, wherein the tube, source connector and receiving connector constitute a transfer tube; and which method further comprises storing the transfer tube substantially inside a bicycle seat stem with one connector too large to enter the seat stem.

16. The method of claim 15, wherein the tube, the source connector, or the receiving connector comprises a one-way valve.

* * * * *